(12) United States Patent
Solomon

(10) Patent No.: US 12,320,720 B2
(45) Date of Patent: Jun. 3, 2025

(54) SYSTEM AND METHOD FOR FIXING AND SEALING SENSORS TO PIPES

(71) Applicant: Aquarius Spectrum Ltd., Netanya (IL)

(72) Inventor: David Solomon, Zikhron Ya'akov (IL)

(73) Assignee: AQUARIUS SPECTRUM LTD., Netanya (IL)

( * ) Notice: Subject to any disclaimer, the term of this patent is extended or adjusted under 35 U.S.C. 154(b) by 390 days.

(21) Appl. No.: 17/497,654

(22) Filed: Oct. 8, 2021

(65) Prior Publication Data

US 2023/0110590 A1    Apr. 13, 2023

(51) Int. Cl.
*G01L 19/00*    (2006.01)
*G01L 19/06*    (2006.01)

(52) U.S. Cl.
CPC ...... *G01L 19/0046* (2013.01); *G01L 19/0645* (2013.01)

(58) Field of Classification Search
None
See application file for complete search history.

(56) References Cited

U.S. PATENT DOCUMENTS

| 4,840,068 | A | 6/1989 | Mayhew, Jr. | |
|---|---|---|---|---|
| 7,004,039 | B1 * | 2/2006 | Ford | G01L 1/02 73/862.581 |
| 8,665,101 | B2 | 3/2014 | Solomon | |
| 9,645,032 | B2 * | 5/2017 | Shimoyama | H04R 1/42 |
| 9,846,075 | B2 | 12/2017 | Solomon | |
| 10,560,764 | B2 | 2/2020 | Solomon et al. | |
| 10,663,093 | B2 * | 5/2020 | Lennon | F16L 13/146 |
| 10,948,377 | B2 | 3/2021 | Solomon et al. | |
| 11,733,115 | B2 * | 8/2023 | Krywyj | G01L 9/04 73/861.27 |
| 2004/0182132 | A1 | 9/2004 | Head | |
| 2018/0113045 | A1 * | 4/2018 | Sato | G01L 9/0044 |

FOREIGN PATENT DOCUMENTS

| EP | 0 940 664 A1 | 9/1999 |
|---|---|---|
| EP | 1 637 859 A1 | 3/2006 |

OTHER PUBLICATIONS

Extended European Search Report issued on EP Application No. 21201739.6, issued Mar. 20, 2022; pp. 1-9.

* cited by examiner

*Primary Examiner* — Peter J Macchiarolo
*Assistant Examiner* — Jermaine L Jenkins
(74) *Attorney, Agent, or Firm* — 24IP Law Group USA, PLLC; Timothy R. DeWitt

(57) ABSTRACT

A device for connecting one or more sensors to a pipe, may include a sealed capsule and a pipe connector. The sealed capsule may include the one or more sensors and a non-corrosive liquid. The pipe connector may be configured to fix the sealed capsule to the pipe. The one or more sensors may be configured to measure pressure or pressure transient from a first liquid via the non-corrosive liquid.

18 Claims, 9 Drawing Sheets

SYSTEM AND METHOD FOR FIXING AND SEALING SENSORS TO PIPES

TECHNICAL FIELD

The present embodiments relate generally to sensors measuring pressure or pressure transients from pipes, and more particularly to systems and methods for fixing and sealing sensors to pipes in a pipe network.

BACKGROUND

Water and other liquids pipes are the core of all industry and water utilities. Pipes are working in stressful conditions. For example, buried pipes have stress from soil and roads vibrations, and industrial pipes have stress from vibrations, temperature and pressure changes. Portable water distribution pipes are buried and work under varying pressure and water hammer (hydraulic shock) which is pressure transients created or caused by pumps and valves.

Pipes also suffer from numerous failures. For example, metal pipes suffer from corrosion, cracks, etc. The pipes are built from sections, connections, appliances and fittings, which may create many failure modes. For example, plastic pipes failure modes include (1) material cracks due to creep, (2) separation of welding, (3) high pressure, (4) poor bedding and local stress, etc. There is a need for detecting and handling such stressful conditions and failures of the pipes.

SUMMARY

The present embodiments relate to systems and methods for fixing and sealing sensors to pipes in a pipe network.

According to further aspects, embodiments provide a device for connecting one or more sensors to a pipe. The device may include a sealed capsule and a pipe connector. The sealed capsule may include the one or more sensors and a non-corrosive liquid. The pipe connector may be configured to fix the sealed capsule to the pipe. The one or more sensors may be configured to measure pressure or pressure transients or acoustic/pressure waves by hydrophone from a first liquid via the non-corrosive liquid.

According to certain aspects, embodiments provide a method for connecting one or more sensors to a pipe. The method may include filling a capsule including the one or more sensors, with a non-corrosive liquid. The method may include sealing the capsule filled with the non-corrosive liquid. The method may include fixing, via a pipe connector, the sealed capsule to the pipe. The method may include measuring, by the one or more sensors, pressure or pressure transients or acoustic/pressure waves from a first liquid in the pipe via the non-corrosive liquid.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
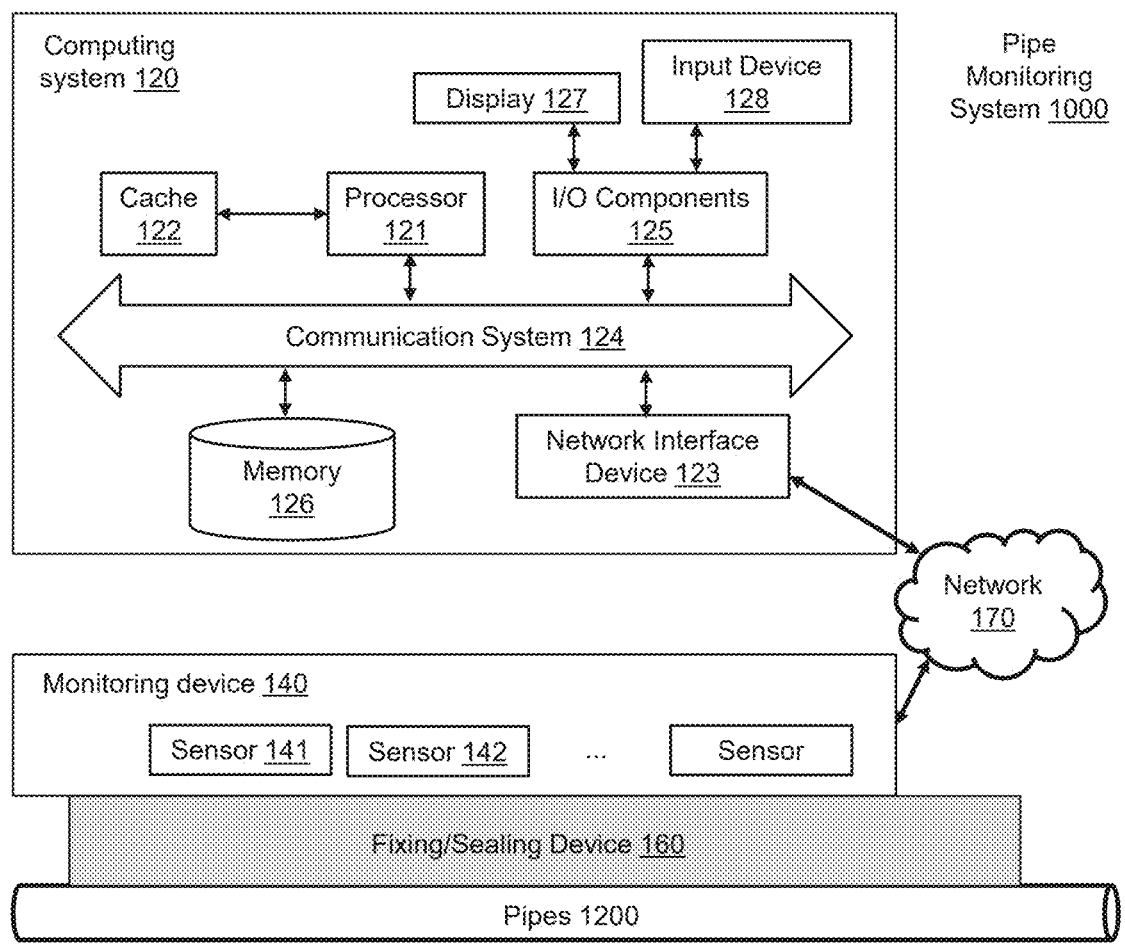
FIG. 1 is a block diagram illustrating an example leak detection system according to some embodiments.

According to certain aspects, embodiments in the present disclosure relate to techniques for fixing and sealing sensors to pipes in a pipe network.

Pressure sensors and hydrophones can perform (1) efficient monitoring of pipes for optimal operation, (2) efficient maintenance, and/or (3) leak and/or failure detection. Particularly pressure sensors can provide overall pipe operational information in order to keep adequate pressure in the network and detect local problems such as pipe obstructions, etc. For example, pressure sensors can provide high frequency recording of pressure, thereby they can detect pressure transients that can be harmful to pipes.

Hydrophones can pick up acoustic waves of the flow and leaks crated by turbulence. Hydrophones can operate with plastic pipes or mixed plastic and metal pipes. For example, systems and methods for leak or failure detection in a pipe network using hydrophones are disclosed in U.S. Pat. No. 8,665,101 to Solomon, U.S. Pat. No. 9,846,075 to Solomon, U.S. Pat. No. 10,560,764 to Solomon, and U.S. Pat. No. 10,948,377 to Solomon. The entire contents of these patent documents are hereby incorporated by reference.

Installing pressure and hydrophone sensors on existing and new pipes is not trivial as the sensors might require maintenance, need to avoid air pockets in the sensors, and/or need to avoid standing or trapped water conditions. Using a multi-sensor of pressure sensor and hydrophone can have many advantages in measuring pressure transients, while using hydrophone as a trigger (see U.S. Pat. Nos. 8,665,101, 10,560,764, and 10,948,377). Additional advantage is correlating the pressure drop with leak detection by hydrophone (because when leak occurs the pressure drops) so that pressure measurement can help to quantify the leak.

One problem relates to high price of conventional pressure sensors and hydrophones. There is need for low cost sensors and hydrophones. Another problem relates to easily and reliably installing sensors and integrating them with pipes to avoid stressful conditions and failures of pipes. For example, easy installation without stopping the water supply may be needed. Reliable installation may be needed as conventional threaded fittings can leak and conventional installation can be subject to corrosivity of water. Installation and integration may need to avoid or prevent air pockets or trapped water conditions. Installation and integration may need to assure water safety by avoiding water contamination during installation, and the appliances themselves also may need to assure water safety or avoid water contamination. Ability to maintain or replace the sensors may be needed.

To solve these problems, according to certain aspects, embodiments in the present disclosure relate to techniques for producing or providing a sensor that is compact, low cost and easily integrating such sensors in a piping system. In some embodiment, a micro-electromechanical systems (MEMS) pressure sensor may be used as a pressure sensor and integrated with pipes. In some embodiments, a miniature hydrophone that has similar structure as MEMS pressure sensor may be used while using piezoelectric membrane.

According to certain aspects, embodiments in the present disclosure relate to techniques for using a sealed capsule filled with a non-corrosive liquid and fixing the capsule in a pipe or a pipe fitting so that one or more sensors in the capsule can measure pressure waves from water through the non-corrosive liquid. In some embodiments, as the MEMS sensors cannot be exposed to water and other corrosive liquids, an isolated and sealed capsule may be provided such that the capsule is filled with non-corrosive liquid such as glycerin that transmits pressure from the water to the sensors. In some embodiments, the non-corrosive liquid may be a gel. The capsule may be designed such that that it can couple the pressure and pressure waves from liquid in the pipes to the sensors using a structure (or a fixing/sealing device) that can fix the capsule in a pipe or pipe fittings may be provided.

In some embodiments, a capsule for a saddle fitting (or a saddle-type pipe connector fitting) may be fixed in a pipe or pipe fittings. For example, a saddle (or a saddle-type pipe connector) may be provided for plastic pipes which are mostly used. In some embodiments, saddles (or saddle-type pipe connectors) can be used for hot tapping, having a drilling device that drills and opens water channel to an outlet. In some embodiments, a saddle (or a saddle-type pipe connector) may provide a thread for connection to pipes. In some embodiments, a saddle (or a saddle-type pipe connector) may provide a thread for connection of a sensor.

In some embodiments, a sensor-capsule or a sensor-integrated capsule may have a rigid structure and a flexible membrane. The rigid structure may be metal or plastic. The flexible membrane may be in contact with a liquid that one or more sensors (e.g., MEMS pressure sensors) can measure. The capsule may be sealed and filled with a capsule liquid which is a non-corrosive liquid such as glycerin. In some embodiments, the non-corrosive liquid may be a gel. The capsule may have rubber sealing rings that can be pressed against a saddle fitting (or a saddle-type pipe connector fitting) or any other fitting, while enabling the flexible membrane to be in contact with water. The capsule may include sensors and electronics on a printed circuit board (PCB) module, and an electric connection (e.g., cable or connector). The PCT module may be connected to external electronics via the electric connection. The capsule may be sealed without air in the capsule in several ways, for example, by welding of plastic by heat. In some embodiments, a capsule may be connected to a saddle (or a saddle-type pipe connector) by thread that enables to press the capsule against the sealing ring in the saddle fitting. In some embodiments, a capsule may be connected to a saddle (or a saddle-type pipe connector) by external bolt and nut that fix the capsule in its place. In some embodiments, the capsule may be connected to the saddle by both the thread and the bolt/nut.

In some embodiments, the membrane may be a pressure sensitive membrane. The pressure sensitive membrane may be made of piezo-resistive material. The resistance of the membrane may be measured via top electrodes that are connected to a bridge electronics or circuit and to an amplifier. In some embodiments, a cavity may be provided under the membrane such that the cavity has a constant reference pressure.

In some embodiments, a hydrophone may be provided in a manner similar to that of a pressure sensor. The hydrophone may include an enclosure that support a piezo-electric membrane. The piezo-electric membrane may be made of lead zirconate titanate (PZT) ceramics or any other piezoelectric material with significant d31 coefficient and with conducting coating on both sides. The membrane may be provided with or without metal support. The membrane may be glued to the enclosure. The membrane may seal a cavity that can be filled with gas at a reference pressure. With this configuration, pressure waves from the water in a pipe can be transmitted to the capsule liquid via a flexible membrane such that the pressure waves can exert pressure on the piezoelectric membrane and create electric charge on both sides on the piezo membrane which can be fed to an amplifier via electrodes.

In some embodiments, a sensor module (or sensor circuitry or a sensor circuit) may include a PCB with one or more electronic circuits that amplify a signal from a hydrophone and/or a pressure sensor. The PCB may be connected to an external electronic box that can be a data logger or a transmitter or a computer via a cable. The cable may include cables or wires respectively connected to a ground, a supply signal, an analog signal, and/or a digital signal. In some embodiments, there may be a connector that is soldered to the PCB and is routed through a capsule body. In some embodiments, a shielding cover may be provided on the PCB to shield electromagnetic interference (EMI) signals or radio-frequency interference (RFI) signals from the sensors. The shielding cover may have slots for liquid passage to transmit the pressure.

According to certain aspects, embodiments in the present disclosure relate to techniques for using an insert-type sensor structure (as a fixing/sealing device) that can be inserted or screwed into a pipe so that one or more sensors in the sensor structure can measure pressure waves from water through a non-corrosive liquid within the sensor structure. In some embodiments, an insert-type sensor or an insert-type sensor structure may be screwed or inserted into a pipe (e.g., a plastic pipe), enabling to measure pressure and/or pressure waves via a flexible membrane and a fluid channel in the sensor structure. The sensor structure may have (1) a fluid channel and a flexible membrane connected to a sensor body, (2) a sensor cavity filled with a non-corrosive liquid (sensor fluid), and (3) a sensor module including one or more sensors. As a result, the pressure from the pipe may be transmitted to the one or more sensors via the flexible membrane and the sensor fluid. Fixing and sealing the sensor to the pipe can be performed by several methods. In some embodiments, the sensor may be fixed to the pipe using a screw with thread (or a screw-type pipe connector), and the sensor may be sealed using mechanical sealing by an O-ring or a conical screw shape. In some embodiments, the sensor can be fixed to the pipe and sealed by electrofusion between the sensor body and the pipe.

In some embodiments, a screw-type sensor (as an insert-type sensor structure or a fixing/sealing device) may have two main parts—(1) a screw (or a screw-type pipe connector) and (2) a sensor body. The sensor body may be connected to the screw. The sensor body may be metal, plastic or a combination of both. The screw-type sensor may include (as a screw-type pipe connector) a screw with a drilling tip and a thread that holds the structure (the screw-type sensor) into a plastic pipe wall. A sealing may seal a sensor connection to the pipe. The sealing can be a rubber gasket or electrofusion coils that melts the plastic to seal the sensor connection to the pipe. A flexible membrane may seal a liquid channel within the screw such that the liquid channel connects the liquid to a sensor cavity. The sensor cavity may be created by the sensor body and may be sealed and filled with a non-corrosive liquid such as glycerin. In some embodiments, the non-corrosive liquid may be a gel or a semi-solid, jelly-like substance. For example, the non-corrosive liquid may be a soft, solid or solid-like material including two or more components, one of which is a liquid, present in substantial quantity. The non-corrosive liquid may be formed by a gelation. The sensor cavity may have a sensor module inside the sensor body. A connector may be used for power supply, signals output to external electronics, signal processing, and transmission. In some embodiments, the screw-type sensor may be screwed inside the pipe using a mechanical key. In some embodiments, in case of a metal bolt, the flexible membrane can be made, created or generated by hydro-forming a thinned screw wall, thereby creating a corrugated surface that can easily move so as to function as a flexible membrane. In some embodiments, in case of a plastic screw, the membrane can be made, created, or generated by a thinned screw wall and/or a corrugated form created by molding.

In some embodiments, a device for connecting one or more sensors to a pipe, may include a sealed capsule and a pipe connector. The sealed capsule may include the one or more sensors and a non-corrosive liquid. The pipe connector may be configured to fix the sealed capsule to the pipe. The one or more sensors may be configured to measure pressure or pressure transient from a first liquid via the non-corrosive liquid.

In some embodiments, the non-corrosive liquid may include glycerin. The capsule may be filled with the non-corrosive liquid such that the non-corrosive liquid transmits pressure from the first liquid to the one or more sensors. The capsule may include a membrane that is in contact with the first liquid such that pressure or pressure transient from the first liquid is transmitted to the one or more sensors via the membrane. The capsule filled with the non-corrosive liquid may be sealed without air in the capsule.

In some embodiments, the pipe connector may include at least one of a saddle-type pipe connector or a screw-type pipe connector. In some embodiments, the pipe connector includes a saddle-type pipe connector, and the sealed capsule is fixed in the saddle-type pipe connector.

In some embodiments, the pipe connector includes a screw-type pipe connector having a drilling tip. The sealed capsule may include a liquid channel that is contained inside the screw-type pipe connector, such that when the drilling tip is placed into the pipe, pressure or pressure transient from the first liquid in the pipe is transmitted to the one or more sensors via the liquid channel.

In some embodiments, the one or more sensors include at least one micro-electromechanical systems (MEMS) sensor. In some embodiments, the one or more sensors include at least one of a pressure sensor or a hydrophone.

Embodiments in the present disclosure can have the following advantages. First, some embodiments can provide useful techniques for providing a sensor or a hydrophone that is compact, low cost and easily integrated in a piping system. In some embodiment, a MEMS pressure sensor which is compact and low cost may be used as a pressure sensor and integrated with pipes. A miniature hydrophone that has similar structure as MEMS pressure sensor may be used while using piezoelectric membrane.

Second, some embodiments can provide useful techniques for easily installing sensors with pipes. In some embodiments, saddles (or saddle-type pipe connectors) can be used for hot tapping, having a drilling device that drills and opens water channel to an outlet, thereby allowing for easy installation without stopping the water supply.

Third, some embodiments can provide useful techniques for reliably integrating sensors with pipes to avoid stressful conditions and failures of pipes. In some embodiments, a sealed capsule filled with a non-corrosive liquid may be fixed or screwed in a pipe so that one or more sensors in the capsule can measure pressure waves from water through the non-corrosive liquid. With this configuration, reliable installation can be performed without exposing the sensors to water, and stressful conditions such as air pockets or trapped water conditions can be avoided. Without exposing the sensors to water, installation and integration can assure water safety by avoiding water contamination, and the sensor or the sensor structure also can assure water safety or avoid water contamination.

Fourth, some embodiments can provide useful techniques for maintaining or replacing the sensors. In some embodiments, a sealed capsule filled with a non-corrosive liquid may be fixed or screwed in a pipe, thereby allowing for replacing the sealed capsule instead of replacing sensors while exposing them to water.

FIG. 1 is a block diagram illustrating an example leak detection system according to some embodiments.

In some embodiments, a pipe monitoring system 1000 may include a computing system 120 and a monitoring device 140 for monitoring an operation of pipes 1200. The monitoring device 140 may be connected or fixed to the pipes 1200 via a fixing/sealing device 160. For example, the monitoring device 140 may be fixed to a pipe via a saddle or a saddle-type pipe connector (see FIG. 2A to FIG. 2C) and/or a fixing/sealing device (see FIG. 3 and FIG. 6). The monitoring device 140 may include a plurality of sensors including sensors 141 and 142. In some embodiments, each of the sensors may be one of an acoustic sensor, an accelerometer, a water meter, a pressure sensor, or a hydrophone. The monitoring device 140 may include a network interface device (not shown) with which measurements data from at least one of the sensors can be transmitted to/from the computing system 120.

Referring to FIG. 1, the illustrated example computing system 120 includes one or more processors 121 in communication, via a communication system 124 (e.g., bus), with memory 126, at least one network interface device 123 with network interface port for connection to a network 170 (e.g., a Local Area Network ("LAN"), a wide area network ("WAN"), a wireless network, and/or the Internet, among others), and other components, e.g., input/output ("I/O") components 125. Generally, the processor(s) 121 will execute instructions (or computer programs) received from memory. The processor(s) 121 illustrated incorporate, or are directly connected to, cache memory 122. In some instances, instructions are read from memory 126 into cache memory 122 and executed by the processor(s) 121 from cache memory 122.

In more detail, the processor(s) 121 may be any logic circuitry that processes instructions, e.g., instructions fetched from the memory 126 or cache 122. In many implementations, the processor(s) 121 are microprocessor units or special purpose processors. The computing device 120 may be based on any processor, or set of processors, capable of operating as described herein. The processor(s) 121 may be single core or multi-core processor(s). The processor(s) 121 may be multiple distinct processors.

The memory 126 may be any device suitable for storing computer readable data. The memory 126 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 120 may have any number of memory devices 126.

The cache memory 122 is generally a form of computer memory placed in close proximity to the processor(s) 121 for fast read times. In some implementations, the cache memory 122 is part of, or on the same chip as, the processor(s) 121. In some implementations, there are multiple levels of cache 122, e.g., L2 and L3 cache layers.

The network interface device 123 manages data exchanges via the network interface (sometimes referred to as network interface ports). The network interface device 123 handles the physical and data link layers of the OSI model for network communication. In some implementations, some of the network interface controller's tasks are handled by one or more of the processor(s) 121. In some implementations, the network interface controller 123 is part of a processor 121. In some implementations, a computing system 120 has multiple network interfaces controlled by a single device 123. In some implementations, a computing system 120 has multiple network interface controllers 123. In some implementations, each network interface is a connection point for a physical network link (e.g., a cat-5 Ethernet link). In some implementations, the network interface controller 123 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 123 implements one or more network protocols such as Ethernet. Generally, a computing device 120 exchanges data with other computing devices via physical or wireless links through a network interface. The network interface may link directly to another device or to another device via an intermediary device, e.g., a network device such as a hub, a bridge, a switch, or a router, connecting the computing system 120 to a data network such as the Internet.

The computing system 120 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 120 may include an interface (e.g., a universal serial bus (USB) interface) for connecting input devices, output devices, or additional memory devices (e.g., portable flash drive or external media drive). In some implementations, a computing device 120 includes an additional device such as a co-processor, e.g., a math co-processor can assist the processor 121 with high precision or complex calculations.

The components 125 may be configured to connect with external media, a display 127, an input device 128 or any other components in the computing system 3000, or combinations thereof. The display 127 may be a liquid crystal display (LCD), an organic light emitting diode (OLED), a flat panel display, a solid state display, a cathode ray tube (CRT), a projector, a printer or other now known or later developed display device for outputting determined information. The display 127 may act as an interface for the user to see the functioning of the processor(s) 121, or specifically as an interface with the software stored in the memory 126.

The input device 128 may be configured to allow a user to interact with any of the components of the computing system 120. The input device 128 may be a plurality pad, a keyboard, a cursor control device, such as a mouse, or a joystick. Also, the input device 128 may be a remote control, touchscreen display (which may be a combination of the display 127 and the input device 128), or any other device operative to interact with the computing system 120, such as any device operative to act as an interface between a user and the computing system 120.

Figure 2A:
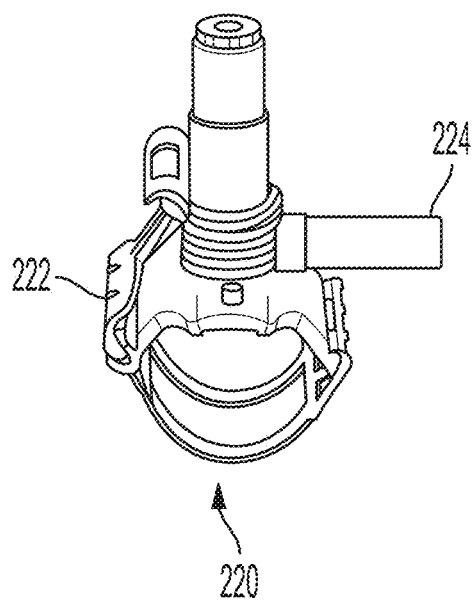
FIG. 2A to FIG. 2C illustrate pipe connectors for connecting sensors and pipes according to some embodiments.
Figure 2B:
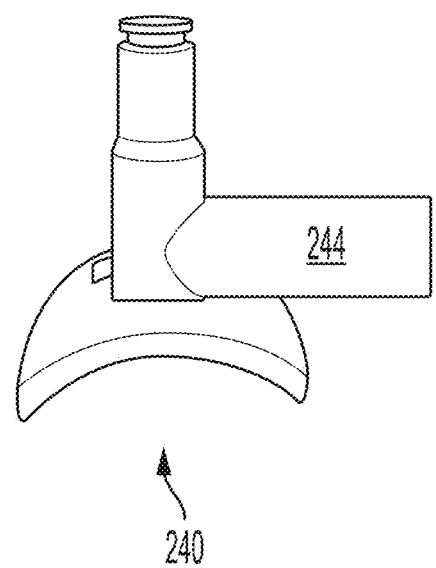
Figure 2C:
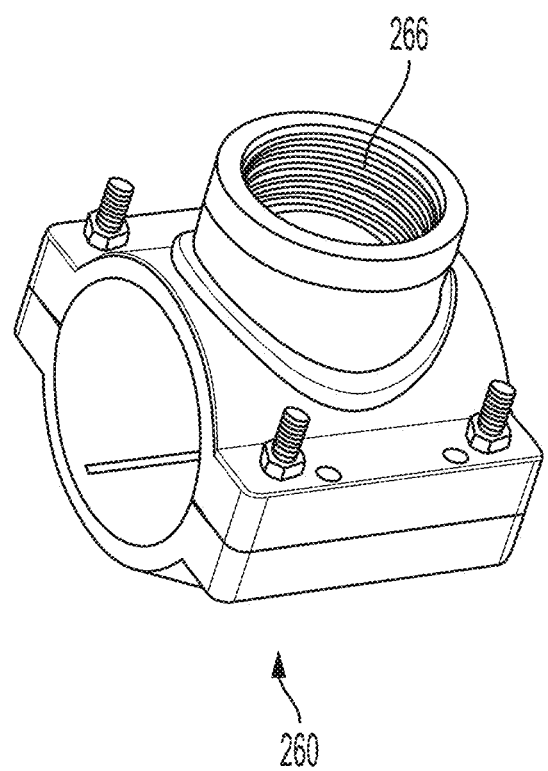

FIG. 2A to FIG. 2C illustrate pipe connectors for connecting sensors and pipes according to some embodiments. In some embodiments, a capsule (e.g., see capsule 30 or 60; see FIG. 3 and FIG. 6) for a saddle fitting (or a saddle-type pipe connector fitting) may be fixed in a pipe or pipe fittings. For example, referring to FIG. 2A, a saddle 220 (or a saddle-type pipe connector) may be provided for plastic pipes which are mostly used. In some embodiments, saddles (or saddle-type pipe connectors) can be used for hot tapping, having a drilling device (e.g., device 222) that drills and opens water channel to an outlet 224. Referring to FIG. 2B, a saddle 240 (or a saddle-type pipe connector) may include an outlet 244. Referring to FIG. 2C, a saddle (or a saddle-type pipe connector) may provide a thread for connection to pipes. In some embodiments, a saddle 260 (or a saddle-type pipe connector) may provide a thread 266 for connection of a sensor.

Figure 3:
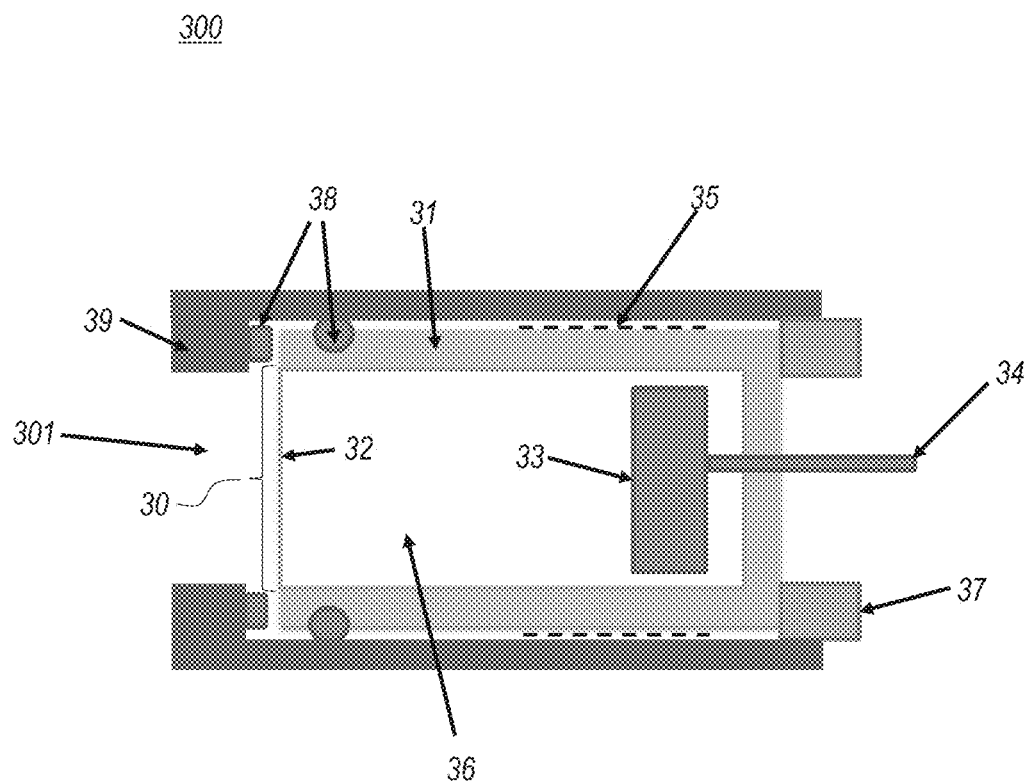
FIG. 3 is a block diagram illustrating an example fixing/sealing device according to some embodiments.

FIG. 3 is a block diagram illustrating an example fixing/sealing device 300 to a pipe according to some embodiments.

Referring to FIG. 3, in the fixing/sealing device 300, a sensor-capsule or a sensor-integrated capsule 30 may have a rigid structure 31 and a flexible membrane 32. The rigid structure may be metal or plastic. The flexible membrane may be in contact with a liquid 301 (e.g., water) that one or more sensors (e.g., MEMS pressure sensors) can measure. The capsule 30 may be sealed and filled with a capsule liquid 36 which is a non-corrosive liquid such as glycerin. In some embodiments, the non-corrosive liquid may be a gel or a semi-solid, jelly-like substance. For example, the non-corrosive liquid may be a soft, solid or solid-like material including two or more components, one of which is a liquid, present in substantial quantity. The non-corrosive liquid may be formed by a gelation.

The capsule 30 may have rubber sealing rings 38 that can be pressed against a saddle fitting 39 (or a saddle-type pipe connector fitting) or any other fitting, while enabling the flexible membrane to be in contact with water 301. The capsule 30 may include sensors and electronics (not shown) on a printed circuit board (PCB) module 33, and an electric connection 34 (e.g., cable or connector). The PCT module may be connected to external electronics via the electric connection. The capsule may be sealed without air in the capsule in several ways, for example, by welding of plastic by heat. In some embodiments, a capsule may be connected to a saddle (or a saddle-type pipe connector) by thread 35 that enables to press the capsule 30 against a sealing ring 38 in the saddle fitting 39. In some embodiments, the capsule may be connected to a saddle (or a saddle-type pipe connector) by external bolt and nut 37 that fix the capsule in its place. In some embodiments, the capsule may be connected to the saddle by both the thread 35 and the bold/nut 37.

Figure 4A:
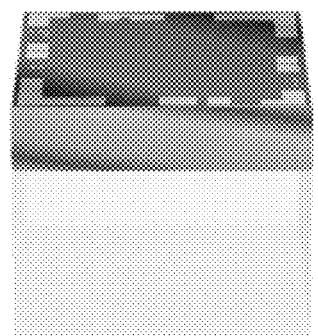
FIG. 4A to FIG. 4C are diagrams illustrating example pressure sensors and hydrophone according to some embodiments.
Figure 4B:
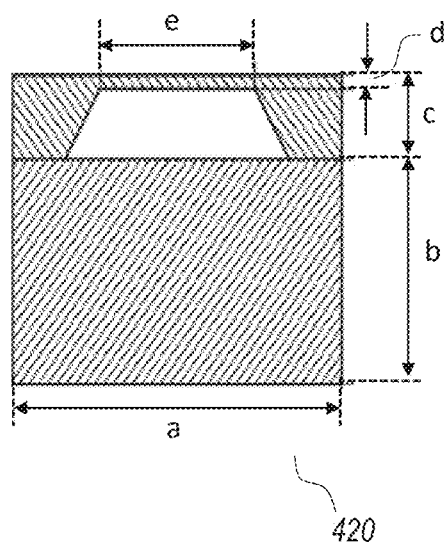
Figure 4C:
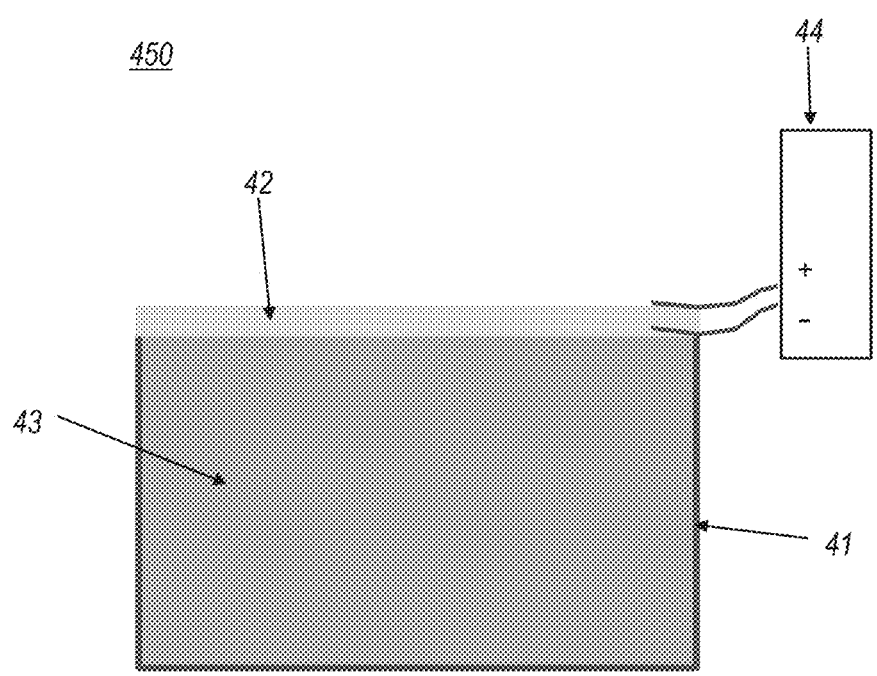

FIG. 4A to FIG. 4C are diagrams illustrating example pressure sensors and hydrophone according to some embodiments. In some embodiment, a micro-electromechanical systems (MEMS) pressure sensor (e.g., MEMS pressure sensor 410, 420) may be used as a pressure sensor that is compact, low cost and easily integrated with a pipe in a piping system. A MEMS pressure sensor may have dimensions as shown in FIG. 4B. For example, dimensions a, b, c, d are set as a=1650±100 µm, b=800±20 µm, c=300±5 µm, d=20 µm. Dimension e indicates a dimension of a diaphragm, and geometry of a diaphragm depends on the specification of a sensor.

Referring to FIG. 4C, in some embodiments, a miniature hydrophone 450 that has similar structure as that of a pressure sensor may be used while using a piezo-electric membrane 42. The hydrophone 450 may include an enclosure 41 that support the piezo-electric membrane 42. The piezo-electric membrane may be made of lead zirconate titanate (PZT) ceramics or any other piezoelectric material with significant d31 coefficient and with conducting coating on both sides. The piezo-electric membrane may be provided with or without metal support. The piezo-electric membrane may be glued to the enclosure. The membrane may seal a cavity 43 that can be filled with gas at a reference pressure. With this configuration, pressure waves from the water in a pipe can be transmitted to the capsule liquid via a flexible membrane such that the pressure waves can exert pressure on the piezoelectric membrane and create electric charge on both sides on the piezo membrane which can be fed to an amplifier via electrodes (e.g., electrodes 44).

In some embodiments, the membrane 42 may be a pressure sensitive membrane. The pressure sensitive membrane may be made of piezo-resistive material. The resistance of the membrane may be measured via top electrodes (e.g., electrodes 44) that are connected to a bridge electronics or circuit and to an amplifier (e.g., electronic circuits 54 in FIG. 5). In some embodiments, a cavity may be provided under the membrane such that the cavity has a constant reference pressure.

Figure 5:
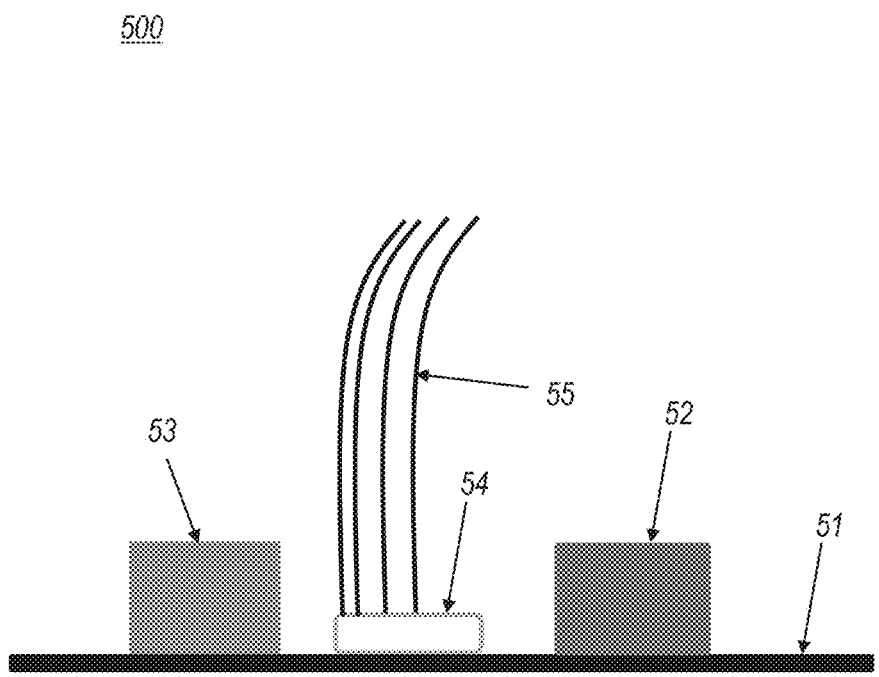
FIG. 5 is a block diagram illustrating an example sensor module according to some embodiment.

FIG. 5 is a block diagram illustrating an example sensor module according to some embodiment.

Referring to FIG. 5, in some embodiments, a sensor module 500 (or sensor circuitry or a sensor circuit) may include a PCB 51 with one or more electronic circuits 54 that amplify a signal from a hydrophone 53 and/or a pressure sensor 52. The PCB may be connected to an external electronic box that can be a data logger or a transmitter or a computer via a cable 55. The cable may include cables or wires respectively connected to a ground, a supply signal, an analog signal, and/or a digital signal. In some embodiments, there may be a connector that is soldered to the PCB and is routed through a capsule body (e.g., body 31 in FIG. 3). In some embodiments, a shielding cover (not shown) may be provided on the PCB to shield electromagnetic interference (EMI) signals or radio-frequency interference (RFI) signals from the sensors. The shielding cover may have slots (not shown) for liquid passage to transmit the pressure.

Figure 6:
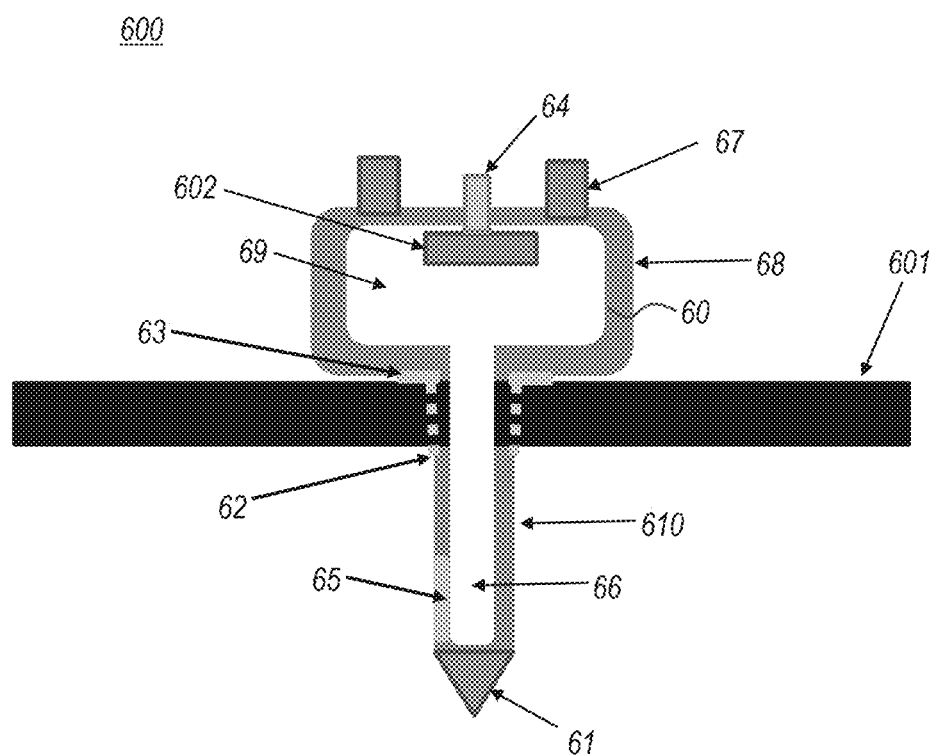
FIG. 6 is a diagram illustrating another example fixing/sealing device according to some embodiments.

FIG. 6 is a diagram illustrating another example fixing/sealing device 600 according to some embodiments.

Referring to FIG. 6, an insert-type sensor structure 600 (as a fixing/sealing device 600) can be inserted or screwed into a pipe (e.g., pipe wall 601) so that one or more sensors in the sensor structure (e.g., one or more sensors in a sensor module 602) can measure pressure waves from water in the pipe through a non-corrosive liquid within the sensor structure. In some embodiments, an insert-type sensor or an insert-type sensor structure may be screwed or inserted into a pipe (e.g., a plastic pipe), enabling to measure pressure and/or pressure waves via a flexible membrane 65 and a fluid channel 66 in the sensor structure. The sensor structure may have (1) a fluid channel 66 and a flexible membrane 65 connected to a sensor body 68 via the fluid channel, (2) a sensor cavity 69 filled with a non-corrosive liquid (sensor fluid), and (3) a sensor module 602 including one or more sensors. The fluid channel 66 and the cavity filled with the non-corrosive liquid may form a sealed capsule 60. As a result, the pressure from the pipe may be transmitted to the one or more sensors via the flexible membrane and the sensor fluid. Fixing and sealing the sensor to the pipe can be performed by several methods. In some embodiments, the sensor may be fixed to the pipe using a screw 610 with thread 62 (or a screw-type pipe connector 610), and the sensor may be sealed using mechanical sealing 63 by an O-ring or a conical screw shape. In some embodiments, the sensor can be fixed to the pipe and sealed by electrofusion between the sensor body and the pipe.

In some embodiments, a screw-type sensor (as an insert-type sensor structure 600 or a fixing/sealing device 600) may have two main parts—(1) a screw 610 (or a screw-type pipe connector) and (2) a sensor body 68. The sensor body may be connected to the screw. The sensor body may be metal, plastic or a combination of both. The screw-type sensor may include (as a screw-type pipe connector 600) a screw 610 with a drilling tip 61 and a thread 62 that holds the structure (the screw-type sensor) into a plastic pipe wall 601. A sealing may seal a sensor connection to the pipe. The sealing 63 can be a rubber gasket or electrofusion coils that melts the plastic to seal the sensor connection to the pipe. A flexible membrane 65 may seal a liquid channel within the screw such that the liquid (fluid) channel 66 connects the liquid to a sensor cavity 69. The sensor cavity may be created by the sensor body 68 and may be sealed and filled with a non-corrosive liquid such as glycerin. The sensor cavity may have a sensor module 602 inside the sensor body. A connector 64 may be used for power supply, signals output to external electronics, signal processing, and transmission. In some embodiments, the screw-type sensor may be screwed inside the pipe using a mechanical key 67. For example, the screw-type sensor may be a self tapping screw that makes a hole in a plastic and makes its own thread so that it is screwed to go smooth inside by rotation of the screw head.

In some embodiments, in case of a metal bolt, the flexible membrane can be made, created or generated by hydroforming a thinned screw wall, thereby creating a corrugated surface that can easily move so as to function as a flexible membrane. In some embodiments, in case of a plastic screw, the membrane can be made, created, or generated by a thinned screw wall and/or a corrugated form created by molding.

Figure 7:
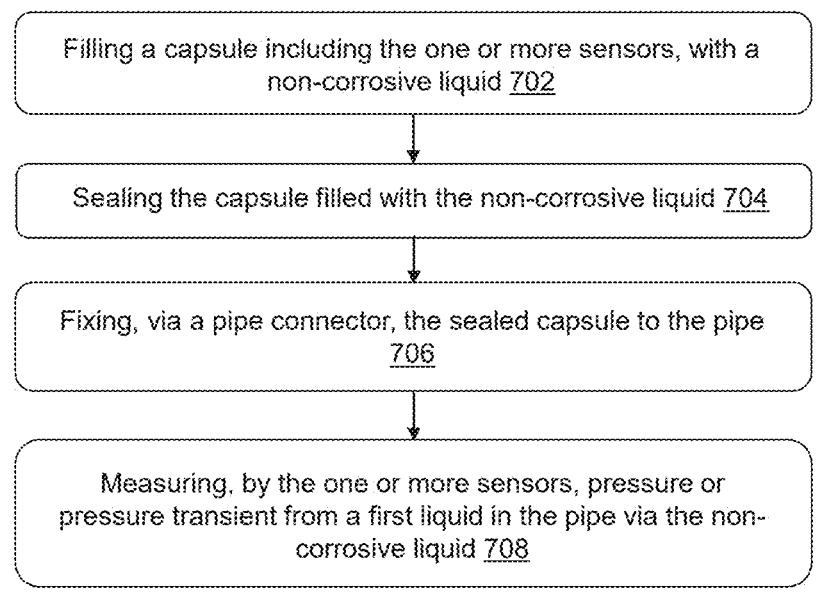
FIG. 7 is a flowchart illustrating an example methodology for fixing and sealing one or more sensors to a pipe.

FIG. 7 is a flowchart illustrating an example methodology for fixing and sealing one or more sensors to a pipe.

In some embodiments, a system (e.g., the pipe monitoring system 1000) may include a processor (e.g., the processor 121 in FIG. 1) and at least one sensor (e.g., the sensors 141, 142 in FIG. 1) installed on a pipe (e.g., the pipes 1200) via a fixing/sealing device (e.g., the device 160).

In this example, the process begins in step S702 by filling a capsule (e.g., capsule 30, 60 in FIG. 3 and FIG. 6) including the one or more sensors (e.g., sensors in sensor module 33, 602 in FIG. 3 and FIG. 6), with a non-corrosive liquid (e.g., non-corrosive liquid 36 in FIG. 3). In some embodiments, the one or more sensors may include at least one micro-electromechanical systems (MEMS) sensor (e.g., MEMS sensor 410, 420 in FIG. 4A and FIG. 4B). In some embodiments, the one or more sensors may include at least one of a pressure sensor or a hydrophone (e.g., hydrophone 450 in FIG. 4C).

In some embodiments, the non-corrosive liquid may include glycerin. In some embodiments, the capsule may be filled with the non-corrosive liquid such that the non-corrosive liquid transmits pressure from a first liquid (e.g., water in the pipe) to the one or more sensors. The capsule may be provided with a membrane (e.g., membrane 32, 65 in FIG. 3 and FIG. 6) that is in contact with the first liquid such that pressure or pressure transient from the first liquid is transmitted to the one or more sensors via the membrane.

In step S704, in some embodiments, the capsule filled with the non-corrosive liquid may be sealed. In sealing the capsule, welding of plastic by heat may be performed to seal the capsule filled with the non-corrosive liquid without air in the capsule.

In step S706, in some embodiments, the sealed capsule may be fixed to the pipe via a pipe connector (e.g., saddle-type pipe connector 220, 240, 260 in FIG. 2A to FIG. 2C; a saddle fitting 39 in FIG. 3; screw-type pipe connector 610 in FIG. 6). In some embodiments, the pipe connector may include at least one of a saddle-type pipe connector or a screw-type pipe connector. In some embodiments, the pipe connector includes a saddle-type pipe connector (e.g., saddle-type pipe connector 220, 240, 260 in FIG. 2A to FIG. 2C; a saddle fitting 39 in FIG. 3), and the sealed capsule 30 may be fixed in the saddle-type pipe connector 39.

In some embodiments, the pipe connector includes a screw-type pipe connector having a drilling tip (e.g., screw-type pipe connector 610 having drilling tip 61 in FIG. 6). The sealed capsule 60 may be provided with a liquid channel 66 that is contained inside the screw-type pipe connector 610, such that when the drilling tip 61 is placed into the pipe, pressure or pressure transient from the first liquid in the pipe (e.g., water in the pipe) is transmitted to the one or more sensors (e.g., sensors in the sensor module 602) via the liquid channel 66.

In step S708, in some embodiments, the one or more sensors may measure pressure or pressure transient from the first liquid in the pipe (e.g., water in the pipe) via the non-corrosive liquid (e.g., non-corrosive liquid 36 or non-corrosive liquid filed in the cavity 69 in FIG. 3 and FIG. 6).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A device for connecting one or more sensors to a pipe, comprising:
    a sealed capsule including the one or more sensors and a non-corrosive liquid; and
    a pipe connector configured to fix the sealed capsule to the pipe,
    wherein the one or more sensors are configured to measure pressure or pressure transients or acoustic/pressure waves from a first liquid via the non-corrosive liquid,
    wherein the pipe connector includes at least one of a saddle-type pipe connector and a screw-type pipe connector.

2. The device according to claim 1, wherein
    the non-corrosive liquid includes glycerin.

3. The device according to claim 1, wherein
    the capsule is filled with the non-corrosive liquid such that the non-corrosive liquid transmits pressure from the first liquid to the one or more sensors.

4. The device according to claim 1, wherein
    the capsule includes a membrane that is in contact with the first liquid such that pressure or pressure transient from the first liquid is transmitted to the one or more sensors via the membrane.

5. The device according to claim 1, wherein
    the capsule filled with the non-corrosive liquid is sealed without air in the capsule.

6. The device according to claim 1, wherein
    the pipe connector includes a saddle-type pipe connector, and
    the sealed capsule is fixed in the saddle-type pipe connector.

7. The device according to claim 1, wherein
    the pipe connector includes a screw-type pipe connector having a drilling tip, and
    the sealed capsule includes a liquid channel that is contained inside the screw-type pipe connector, such that when the drilling tip is placed into the pipe, pressure or pressure transient from the first liquid in the pipe is transmitted to the one or more sensors via the liquid channel.

8. The device according to claim 1, wherein
    the one or more sensors include at least one microelectromechanical systems (MEMS) sensor.

9. The device according to claim 1, wherein
    the one or more sensors include at least one of a pressure sensor or a hydrophone.

10. A method for connecting one or more sensors to a pipe, comprising:
    filling a capsule including the one or more sensors, with a non-corrosive liquid;
    sealing the capsule filled with the non-corrosive liquid;
    fixing, via a pipe connector, the sealed capsule to the pipe, wherein the pipe connector includes at least one of a saddle-type pipe connector or a screw-type pipe connector; and
    measuring, by the one or more sensors, pressure or pressure transient from a first liquid in the pipe via the non-corrosive liquid.

11. The method according to claim 10, wherein
    the non-corrosive liquid includes glycerin.

12. The method according to claim 10, wherein
    the capsule is filled with the non-corrosive liquid such that the non-corrosive liquid transmits pressure from the first liquid to the one or more sensors.

13. The method according to claim 10, further comprising:
    providing the capsule with a membrane that is in contact with the first liquid such that pressure or pressure transient from the first liquid is transmitted to the one or more sensors via the membrane.

14. The method according to claim 10, wherein
    sealing the capsule comprises performing welding of plastic by heat to seal the capsule filled with the non-corrosive liquid without air in the capsule.

15. The method according to claim 10, wherein
    the pipe connector includes a saddle-type pipe connector, and
    the method further comprises fixing the sealed capsule in the saddle-type pipe connector.

16. The method according to claim 10, wherein
    the pipe connector includes a screw-type pipe connector having a drilling tip, and
    the method further comprises providing the sealed capsule with a liquid channel that is contained inside the screw-type pipe connector, such that when the drilling tip is placed into the pipe, pressure or pressure transient from the first liquid in the pipe is transmitted to the one or more sensors via the liquid channel.

17. The method according to claim 10, wherein
    the one or more sensors include at least one microelectromechanical systems (MEMS) sensor.

18. The method according to claim 10, wherein the one or more sensors include at least one of a pressure sensor or a hydrophone.

\* \* \* \* \*